US 6,730,807 B1

(12) United States Patent
Häberle et al.

(10) Patent No.: US 6,730,807 B1
(45) Date of Patent: May 4, 2004

(54) CARBODIIMIDES WITH CARBOXYL OR CARBOXYLATE GROUPS

(75) Inventors: Karl Häberle, Speyer (DE); Reinhard Treiber, Leimen (DE); Christian Lach, Bad Dürkheim (DE); Ulrike Licht, Mannheim (DE); Bernd Meyer-Roscher, Neustadt (DE); Peter Weyland, Frankenthal (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 126 days.

(21) Appl. No.: 10/088,517

(22) PCT Filed: Oct. 31, 2000

(86) PCT No.: PCT/EP00/10684

§ 371 (c)(1),
(2), (4) Date: Mar. 29, 2002

(87) PCT Pub. No.: WO01/34559

PCT Pub. Date: May 17, 2001

(30) Foreign Application Priority Data

Nov. 11, 1999 (DE) .......................... 199 54 500

(51) Int. Cl.⁷ ............................. C07C 241/00
(52) U.S. Cl. .................. 562/439; 528/61; 562/440
(58) Field of Search ............... 562/439, 440; 528/61

(56) References Cited

U.S. PATENT DOCUMENTS

| | | | | |
|---|---|---|---|---|
| 2,941,983 A | * | 6/1960 | Smeltz | |
| 5,574,083 A | * | 11/1996 | Brown | |
| 5,576,398 A | | 11/1996 | Takahashi et al. | |
| 5,597,942 A | | 1/1997 | Lehrich et al. | |
| 5,859,166 A | | 1/1999 | Horie et al. | |
| 5,936,055 A | * | 8/1999 | Elwell | |

* cited by examiner

Primary Examiner—Michael L. Shippen
(74) Attorney, Agent, or Firm—Oblon, Spivak, McClelland, Maier & Neustadt, P.C.

(57) ABSTRACT

Compounds containing carbodiimide units and carboxyl or carboxylate groups (compounds V), derived from a) aliphatic or araliphatic $C_4$ to $C_{20}$ polyisocyanates (component a)
b) amino carboxylic acids or amino carboxylic salts (component b) and
c) if desired, further compounds which carry groups able to react with isocyanate groups in an addition reaction (component c)
d) if desired, other isocyanates (component d), the carbodiimide units deriving essentially exclusively from the isocyanate groups of component (a).

14 Claims, No Drawings

CARBODIIMIDES WITH CARBOXYL OR CARBOXYLATE GROUPS

BACKGROUND OF THE INVENTION

1. Field of the Invention

The invention relates to compounds containing carbodiimide units and carboxyl or carboxylate groups (compounds V), derived from a) aliphatic or araliphatic $C_4$ to $C_{20}$ polyisocyanates (component a)

b) amino carboxylic acids or amino carboxylic salts (component b) and c) if desired, further compounds which carry groups able to react with isocyanate groups in an addition reaction (component c)

d) if desired, other isocyanates (component d), the carbodiimide units deriving essentially exclusively from the isocyanate groups of component (a).

2. Description of the Background

Organic carbodiimides and their use as additives to aqueous polymer dispersions are known. It is also known that these polymer dispersions, for example, are added in order to increase the molecular weight of the polymers. To permit the carbodiimides to be dispersed simply and homogeneously in the dispersion, they are provided with hydrophilic groups.

EP-A-198 343 describes carbodiimides which carry sulfonate groups and, if desired, polyethylene oxide units as well.

EP-A-686 626, furthermore, discloses carbodiimides in which the hydrophilicity is brought about by means of ammonium groups, which are introduced by way of dialkylamino alcohols, by means of sulfonate groups which are introduced by way of salts of hydroxy-functional alkylsulfonic acids, or by means of polyethylene oxide radicals.

The abovementioned products, however, have the following disadvantages:

Cationic products such as carbodiimides hydrophilicized by ammonium groups are not compatible with the anionically stabilized dispersions commonly used.

The carbodiimides hydrophilicized with sulfonate groups are difficult to prepare. Because of the highly lipophobic character of the salts used as starting compounds, the reaction with the hydrophobic isocyanato-containing precursors is extremely difficult, since the mutual solubility is very low.

The dispersions cured with carbodiimides hydrophilicized with polyalkylene oxide radicals possess a permanent hydrophilicity which is unwanted.

DE-A-19821668, unpublished at the priority date of the present specification, discloses carbodiimides based on 1,3-bis(1-methyl-1-isocyanatoethyl)benzene in which the hydrophilicization is brought about with amino sulfonic acids.

SUMMARY OF THE INVENTION

It is an object of the present invention to provide carbodiimides which are compatible with the customary, anionically stabilized polymer dispersions, are easy to prepare, and do not impart any additional, permanent hydrophilicity to the dispersion films cured with them.

The compounds (V) contain preferably from 200 to 2000 mmol/kg, with particular preference from 500 to 1800 mmol/kg, of carboxyl or carboxylate groups, based on the weight of the carbodiimides.

The proportion of carbodiimide groups is generally from 0.05 to 8, preferably from 0.10 to 5, mol/kg based on the weight of the carbodiimides.

The carbodiimide units in the carbodiimides of the invention are formed essentially by the combination of pairs of NCO groups of component (a) with elimination of carbon dioxide, so forming a carbodiimide.

The compounds (V) contain preferably at least one carbodiimide structure, preferably more than one carbodiimide structure; with particular preference, the (number-)average degree of condensation, i.e., the average number of carbodiimide structures in the carbodiimides of the invention, is from 1 to 20, in particular from 2 to 15.

Suitable monomers (a) are the aliphatic or araliphatic isocyanates having 4 to 20 carbon atoms that are commonly used in polyurethane chemistry.

Mention may be made in particular of diisocyanates $X(NCO)_2$, where X is an aliphatic hydrocarbon radical having 4 to 12 carbon atoms, a cycloaliphatic hydrocarbon radical having 6 to 15 carbon atoms, or an araliphatic hydrocarbon radical having 7 to 15 carbon atoms. Examples of diisocyanates of this kind are tetramethylenediisocyanate, hexamethylenediisocyanate, dodecamethylenediisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)propane, trimethylhexane diisocyanate, 1,4-diisocyanatobenzene, 1,3-bis(1-methyl-1-isocyanatoethyl)benzene (TMXDI), the isomers of bis(4-isocyanatocyclohexyl)methane (HMDI) such as the trans/trans, the cis/cis and the cis/trans isomer, and mixtures of these compounds.

The carbodiimides of the invention therefore preferably comprise units of the formula I

—X—N=C=N—X—[—N=C=N—X—]$_n$—   I where

X is as defined above, and n is an integer from 0 to 10, preferably 0, 1, 2 or 3.

With particular preference, X is derived from TMXDI or hexamethylenediisocyanate.

Suitable amino carboxylic acids and salts thereof (component B) are, for example, the alpha-amino carboxylic acids specified in Fieser and Fieser, Organische Chemie, 2nd, improved edition, 1982, on p. 1260 ff.; preferably: beta-amino carboxylic acids such as β-alanine or the Michael adducts of diprimary diamines with α,β-unsaturated carboxylic acids. Where the amino carboxylic acids are used in the form of their salts, particularly suitable salts are alkali metal, alkaline earth metal, or ammonium salts.

Such compounds conform, for example, to the formula (II)

$$H_2N—R^4—NR—R^5—X \quad (II)$$

where

—$R^4$ and $R^5$, independently of one another, are a $C_1$ to $C_6$ alkanediyl unit, preferably ethylene, and X is COOH or a carboxylate group.

Particularly preferred compounds of the formula (II) are N-(2-aminoethyl)-2-aminoethanecarboxylic acid and the corresponding alkali metal salts, Na being the particularly preferred counterion.

Preferred compounds (V) are those of the formula III

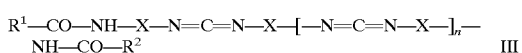

$R^1$—CO—NH—X—N=C=N—X—[—N=C=N—X—]$_n$—
NH—CO—$R^2$   III where n and X are as defined for formula I and $R^1$ and $R^2$ are radicals derived from component (b) by abstracting therefrom a hydrogen atom attached to an amino group.

The compounds (V) may, if desired, further comprise, in addition to the structural units derived from components (a) and (b), further structural units which are derived from components (c) and (d) and which comprise primarily urethane units or urea units. These units are formed by reacting the isocyanate groups of the component (d) with the isocyanate-reactive groups of component (c) or with the amino groups of component (b) or by reacting isocyanate-reactive groups of component (c) with the isocyanate groups of component (a). By means of the structural units derived from components (c) and (d), therefore, the structural units of the formula I are interrupted or terminated or are located between a structural unit formed from component (a) and (b). Components (c) and (d) thus serve primarily to regulate the molecular weight, since components (c) and (d) act primarily as chain extenders or chain terminators.

Components (c) carry groups which are able to react with isocyanate groups in an addition reaction. For example, standard substances may be used which by virtue of their reaction with isocyantes produce urethane groups or urea groups. For example, aromatic, aliphatic or araliphatic compounds having 1 to 20 carbon atoms may be used whose isocyanate-reactive groups comprise hydroxyl and/or amino groups. Preferred compounds having at least two isocyanate-reactive groups are organic compounds having at least two hydroxyl groups, having at least two amino groups and/or having at least one hydroxyl group and at least one amino group. Examples which may be used include the following: aromatic, araliphatic and/or aliphatic polyols having 2 to 20 carbon atoms, preferably those having primary hydroxyl groups. Examples that may be mentioned include: 1,2-ethanediol, 1,3-propanediol, 1,2-propanediol, 1,4-butanediol, 2,4-butanediol and/or 2,3-butanediol, 1,5-pentanediol, 1,6-hexanediol, 1,7-heptanediol, 1,8-octanediol, 1,10-decanediol, neopentyl glycol, 2-methyl-1,3-propanediol, 2- and 3-methyl-1,5-pentanediol, polyethylene glycols, polypropylene glycols, preferably having 2 hydroxyl groups, the isomers of bis (hydroxymethyl- or -ethyl)benzene, hydroxyalkyl ethers of dihydroxybenzenes, trimethylolpropane, glycerol, pentaerythritol, or sugars having, for example, 4, 5 or 6 hydroxyl groups.

If isocyanate-reactive compounds having ethylene oxide units are used, the proportion of ethylene oxide units in the carbodiimides of the invention should be preferably from 1 to 15% by weight, based on the weight of the carbodiimides. Preferably, no such compounds are used.

Amines suitable for use are amines having at least two primary and/or secondary amino groups. By way of example, the following may be mentioned: amines of the molecular weight range from 32 to 500 g/mol, preferably from 60 to 300 g/mol, which contain at least two primary, at least two secondary, or one primary and one secondary amino group. Examples thereof are diamines such as diaminoethane, diaminopropane, diaminobutane, diaminopentane, diaminohexane, piperazine, 2,5-dimethylpiperazine, 1-amino-3,3,5-trimethyl-5-aminomethylcyclohexane (isophoronediamine, IPDA), 4,4'-diaminodicyclohexylmethane, 1,4-diaminocyclohexane, aminoethylethanolamine, hydrazine, hydrazine hydrate, or triamines such as diethylenetriamine or 1,8-diamino-4-aminomethyloctane.

It is further possible to use amines derived from the abovementioned amines by the substitution or one or more primary amino groups by further substituents, such as alkyl groups, for example, to form secondary amino groups. It is further possible to use compounds which have both at least one hydroxyl group and at least one amino group, examples being ethanolamine, propanolamine, isopropanolamine, aminoethylethanolamine, and N-alkyl amines derived therefrom.

Preference is given to the use of linear alcohols, amines or amino alcohols, with particular preference being given to those having an even number of carbon atoms. Preference extends to alcohols, amines or amino alcohols containing cyclic structural elements.

If desired, it may be judicious, in addition to the above-described isocyanate-reactive compounds having at least two functional groups, to use monofunctional compounds as well in order to regulate the molecular weight of the carbodiimides of the invention, especially if the diisocyanates are reacted to the carbodiimides in a first step and then the isocyanato-containing carbodiimides are reacted with the isocyanate-reactive compounds. Examples of monofunctional isocyanate-reactive compounds that may be used include amines and, preferably, alcohols. Suitable amines, examples being primary or preferably secondary amines, advantageously possess 1 to 12 carbon atoms, preferably 2 to 8 carbon atoms. Examples that may be mentioned include methyl-, ethyl-, propyl-, butyl-, pentyl-, hexyl-, 2-ethylhexyl-, octyl-, decyl-, diethyl-, dipropyl-, dibutyl-, methylbutyl-, ethylbutyl- and ethylhexylamine and also cyclohexylamine and benzylamine. To neutralize the isocyanate groups it is preferred, however, to use alcohols, e.g., primary or secondary alcohols having 1 to 18 carbon atoms, preferably 2 to 8 carbon atoms. Examples of primary or secondary alcohols that may be mentioned include methanol, ethanol, n-propanol, isopropanol, n-butanol, sec-butanol, n-pentanol, technical-grade pentanol mixtures, n-hexanol, technical-grade hexanol mixtures, 2-ethylhexanol, octanol, 2-ethyloctanol, decanol and dodecanol, and also cyclohexanol and benzyl alcohol.

Component (b) is preferably used with monofunctional compounds, with particular preference with monoamines.

In general, the molecular weight of components (c) is less than 400; in particular, the carbodiimides of the invention are free from units derived from macropolyols such as polyether polyols or polyester polyols having a molecular weight of more than 400.

As component (d), aromatic isocyanates are primarily suitable, examples being 1,4-diisocyanatobenzene, 2,4-diisocyanatotoluene, 2,6-diisocyanatotoluene, 4,4'-diisocyanatodiphenylmethane and 2,4'-diisocyanatodiphenylmethane.

In general, the amount of components (c) and (d) as a proportion of all components (a) to (d) used to prepare the compounds V is not more than from 0 to 40%, preferably from 0 to 30% by weight.

The carbodimides of the invention are prepared essentially by two reaction steps, comprising
I. preparing carbodiimides having terminal isocyanate groups by carbodiimidizing some of the isocyanate groups of component (a), and
II. reacting the isocyanato-terminal compounds prepared in step I with component (b) and, if desired, with components (c) and (d).

In step I, carbodiimide structures are produced by the familiar reaction of the isocyanate groups with one another, with elimination of carbon dioxide, in the presence of customary catalysts known for this reaction. In step II, isocyanate groups are reacted with isocyanate reactive compounds, in a known manner, to prepare urethane and/urea structures.

The molar ratio of the NCO groups of the isocyanate-containing carbodiimide to the sum of the isocyanate-reactive groups of component (c) and the amino groups of component (a) is usually from 10:1 to 0.2:1, preferably from 5:1 to 0.5:1.

Alternatively, the carbodiimides of the invention may be obtained by first reacting component (a) with components (b) and, if desired, (c), the ratio of isocyanate groups used to the sum of the isocyanate-reactive groups of component (c) and the amino groups-of component (b) being at least 2:1, and then reacting the isocyanato-containing reaction product in the presence of catalysts, with release of carbon dioxide, to give carbodiimides. In accordance with this process variant, up to 50% by weight, preferably up to 23% by weight, of the isocyanate groups of component (a) are first reacted with the isocyanate-reactive compounds and then some or all of the free isbcyanate groups are reacted in the presence of catalysts, with release of carbon dioxide, to give carbodlimide groups.

The reactions may preferably be conducted in the presence of a solvent and, if desired, a solubilizing auxiliary solvent, with particular preference in the presence of a solvent and a solubilizing auxiliary solvent. A suitable solvent is preferably water. Suitable solubilizing auxiliary solvents are, in particular, those compounds which readily dissolve the product of the reaction of step I and are also miscible with water, examples being methanol, ethanol, n- and/or isopropanol, propanone, tetrahydrofuran, dioxane, N-methylpyrrolidone, dimethylformamide, dimethylacetamide and/or propylenecarbonate. It is preferred to use auxiliary solvents having a boiling point at 1013 mbar of <100° C. The weight ratio of solvent to auxiliary solvent is usually from 50:1 to 0.02:1.

The reaction of the water and also of the alcoholic auxiliary solvents with the isocyanate groups is relatively slow compared with that of the amino group of component (b). Free amino carboxylic acids are betaines and are preferably soluble in water. Following protonation of the nitrogen, they do not react with the isocyanate groups, so that the amino group can be freed preferably with an auxiliary base, examples being alkali(ne) earth) metal hydroxides or carbonates, tertiary amines, quaternary ammonium hydroxides, preferably alkali metal hydroxides or tertiary amines, with particular preference NaOH, KOH, triethylamine or dimethylethanolamine.

The process step in which the carbodiimide groups are formed may be conducted at elevated temperatures, for example at temperatures from 50 to 200° C., preferably from 150 to 185° C., judiciously in the presence of catalysts. Processes suitable for this purpose are described, for example, in GB-A-1 083 410, DE-B-1 130 594 (GB-A-851 936) and DE-A-11 56 401 (US-A-3 502 722). Catalysts which have proven preeminently suitable are, for example, phosphorus compounds, selected preferably from the group consisting of phospholenes, phospholene oxides, phospholidines and phospholine oxides. When the reaction mixture has the desired NCO group content, polycarbodiimide formation is normally ended. For this purpose the catalysts may be distilled off under reduced pressure or deactivated by adding a deactivator, such as phosphorus trichloride, for example. Polycarbodiimide preparation may further be conducted in the absence or presence of solvents that are inert under the reaction conditions.

The temperature during the step in which predominantly urethane groups and urea groups are formed is usually from 10 to 100° C.

If component (a) is reacted first to give an isocyanato-containing carbodiimide (step I) and then to give the compound (V), the intermediate formed in step I preferably has an NCO content of from 1 to 18% by weight.

Through a suitable choice of the reaction conditions, such as the reaction temperature, type and amount of catalyst, and the reaction time, for example, the skilled worker is able to adjust the degree of condensation in the customary manner. The course of the reaction can be monitored most easily by determining the NCO content. Other parameters as well, such as viscosity increase, deepening in color, or $CO_2$ evolution, for example, may be used in order to monitor the course of, and control, the reaction.

The compound (V) of the invention is suitable in particular for increasing the molecular weight of the polymers (P) which are present in the form of an aqueous dispersion.

Suitable polymers (P) are virtually all film-forming addition polymers.

The polymers (P) preferably carry carboxyl groups, generally in amounts of from 0.01 to 2 mmol/kg.

Mixtures of compounds (V) and aqueous dispersions comprising polymer (P) contain compounds (V) and polymer (P) preferably in a ratio of from 0.005:1 to 1:1.

The mixing operation is not critical and may be performed, for example, by stirring compound (V) into the aqueous-dispersions comprising polymer (P). The mixing operation may take place at any desired point in time prior to use of said dispersions.

Examples of suitable polymers (P) are water-dispersible polyurethanes (polymers PII). Polyurethanes of this kind and the dispersions comprising them are general knowledge (cf. Ullmann's Encyclopedia of Industrial Chemistry, $5^{th}$ Edition, Volume A 21, pages 677 f.).

Dispersions of this kind are preferably synthesized from

IIa) diisocyanates having 4 to 30 carbon atoms,

IIb) diols of which

IIb1) from 10 to 100 mol %, based on the total amount of the diols (IIb), have a molecular weight of from 500 to 5000, and IIb2) from 0 to 90 mol % based on the total amount of the diols (IIb), have a molecular weight of from 60 to 500 g/mol, IIc) monomers different than the monomers (IIa) and (IIb) and containing at least one isocyanate group or at least one isocyanate-reactive group, and further carrying at least one hydrophilic group or potentially hydrophilic group, thereby rendering the polyurethanes dispersible in water, IId) if desired, further polyfunctional compounds different than the monomers (IIa) to (IIc) and having reactive groups which comprise alcoholic hydroxyl groups, primary or secondary amino groups or isocyanate groups, and IIe) if desired, monofunctional compounds different than the monomers (IIa) to (IId) and having a reactive group which comprises an alcoholic hydroxyl group, a primary or secondary amino group or an isocyanate group.

Suitable monomers (IIa) are the aliphatic or aromatic diisocyanates commonly used in polyurethane chemistry. Preference is given to the monomers (IIa), or mixtures thereof, which are also mentioned as monomers (IIa) in DE-A-19521500.

Suitable monomers (IIb) and (IId) are preferably the monomers (IIb) and (IId) mentioned in DE-A-19521500.

Monomers. Il1 are, for example, polyesterdiols or polyether diols.

Monomers IIb2 are, for example, aliphatic diols having 2 to 12 carbon atoms, e.g., 1,4-butanediol or 1,6-hexanediol.

Suitable monomers (IId) are, for example, aliphatic amines having 2 to 12 carbon atoms and 2 to 4 primary and/or secondary amino groups. Examples are ethylenediamine, isophorone diamine, and diethylenetriamine.

In order to ensure that the polyurethanes are dispersible in water, the polyurethanes are synthesized not only from components (IIa), (IIb) and (IId) but also from monomers (IIc), which are different than components (IIa), (IIb) and (IId), carry at least one isocyanate group or at least one isocyanate-reactive group, and also carry at least one hydrophilic group or group convertible to a hydrophilic group. In the text below, the term hydrophilic groups or potentially hydrophilic groups is abbreviated to "(potentially) hydrophilic groups". The (potentially) hydrophilic groups react with isocyanates substantially more slowly than do the functional groups of the monomers used to synthesize the polymer main chain.

Preferred monomers (IIc) are likewise the monomers referred to as monomers (IIc) in DE-A-19521500.

The amount of components having (potentially) hydrophilic groups as a proportion of the total amount of components (IIa), (IIb), (IIc), (IId) and (IIe) is generally such that the molar amount of the (potentially) hydrophilic groups, based on the amount by weight of all monomers (a) to (e), is from 80 to 1200, preferably from 140 to 1000, and with particular preference from 200 to 800, mmol/kg.

The (potentially) hydrophilic groups may comprise nonionic groups, e.g., polyethylene oxide groups, or, preferably, (potentially) ionic hydrophilic groups, e.g., carboxylate groups or sulfonate-groups. It is preferred to operate without effective amounts of nonionic groups.

The proportion of nonionic hydrophilic groups, if such are incorporated, is in general up to 5, preferably up to 3, with particular preference up to 1% by weight, based on the amount by eight of all monomers (IIa) to (IIe).

Monomers (IIe), which are used if desired, are monoisocyanates, monoalcohols, and mono-primary and mono-secondary amines. In general their proportion is not more than 10 mol %, based on the total molar amount of the monomers. These monofunctional compounds usually carry further functional groups such as carbonyl groups and are used to introduce into the polyurethane functional groups which permit the dispersing and/or crosslinking or further polymer-analogous reaction of the polyurethane.

In the field of polyurethane chemistry it is general knowledge as to how the molecular weight of the polyurethanes may be adjusted by choosing the proportions of the co-reactive monomers and also the arithmetic mean of the number of reactive functional groups per molecule.

Normally, the components (IIa) to (IIe) and their respective molar amounts are chosen such that the ratio A:B, where A) is the molar amount of isocyanate groups, and B) is the sum of the molar amount of the hydroxyl groups and the molar amount of the functional groups which are able to react with isocyanates in an addition reaction, is from 0.5:1 to 2:1, preferably from 0.8:1 to 1.5, with particular preference from 0.9:1 to 1.2:1. With very particular preference, the ratio A:B is as close as possible to 1:1.

Furthermore, the proportion of the monomers (a) is preferably chosen such that the amount of the monomers (IIa) as a proportion of the monomers (IIa) to (II) is from 20 to 70% by weight.

Th monomers (IIa) to (IIe) that are used carry on average usually from 1.5 to 2.5, preferably from 1.9 to 2.1, with particular preference from 2.0, isocyanate groups and/or functional groups which are able to react with isocyanates in an addition reaction.

The various preparation methods of the polymers PII are general knowledge and are described in more detail, for example, in DE-A-19807754.

Furthermore, the polymers (P) may comprise customary emulsion addition polymers (polymers PIII).

These are generally synthesized from

IIIa) from 30 to 99.9% by weight of principal monomers selected from $C_1$ to $C_{20}$ alkyl(meth)acrylates, vinyl esters of carboxylic acids containing up to 20 carbon atoms, vinylaromatic compounds having up to 20 carbon atoms, ethylenically unsaturated nitriles, vinyl halides, and aliphatic hydrocarbons having 2 to 8 carbon atoms and 1 or 2 double bonds, IIIb) from 0 to 20, preferably from 0.01 to 20, % by weight of a carboxylic acid having one olefinic double bond, and IIIc) from 0 to 20% by weight of free-radically polymerizable monomers different than (IIIa) and (IIIb).

Examples of monomers (IIIa) are (meth)acrylic acid alkyl esters having a $C_1$–$C_{10}$ alkyl radical, such as methyl methacrylate, methyl acrylate, n-butyl acrylate, ethyl acrylate, and 2-ethylhexyl acrylate.

In particular, mixtures of the (meth)acrylic acid alkyl esters are also suitable.

Vinyl esters of carboxylic acids having 1 to 20 carbon atoms are, for example, vinyl laurate, vinyl stearate, vinyl propionate, and vinyl acetate.

Suitable vinyl aromatic compounds are vinyl toluene, alpha- and p-methylstyrene, alpha-butyl styrene, 4-n-butyl styrene, 4-n-decylstyrene, and, preferably, styrene.

Examples of nitriles are acrylonitrile and methacrylonitrile.

The vinyl halides are chlorine-, fluorine- or bromine-substituted, ethylenically unsaturated compounds, preferably vinyl chloride and vinylidene chloride.

Nonaromatic hydrocarbons that may be mentioned having 2 to 8 carbon atoms and one or two olefinic double bonds are butadiene, isoprene and chloroprene, and also ethylene, propylene and isobutylene.

The principal monomers (IIIa) are also used preferably in a mixture.

Vinylaromatic compounds such as styrene are frequently used, for example, in a mixture with $C_1$–$C_{20}$-alkyl (meth) acrylates, in particular with $C_1$–$C_8$-alkyl (meth)acrylates, or with nonaromatic hydrocarbons such as isoprene,-or, preferably, butadiene.

Suitable monomers (IIIb) are preferably (meth)acrylic acid or maleic acid.

Examples of suitable monomers (IIIc) are the following: esters of acrylic and methacrylic acid with alcohols having 1 to 20 carbon atoms, which in addition to the oxygen atom in the alcohol group contain a least one further heteroatom and/or contain an aliphatic or aromatic ring, such as 2-ethoxyethyl acrylate, 2-butoxyethyl (meth)acrylate, dimethylaminoethyl (meth)acrylate, diethylaminoethyl (meth) acrylate, (meth)acrylic aryl, alkaryl or cycloalkyl esters, such as cyclohexyl (meth)acrylate, phenyl ethyl (meth) acrylate, phenylpropyl (meth)acrylate, or acrylic esters of heterocyclic alcohols such as furyl (meth)acrylate.

Furthermore, suitable monomers (IIIc) are also monomers having amino groups or amide groups, such as (meth) acrylamide, and also the derivatives thereof substituted on the nitrogen by $C_1$–$C_4$ alkyl.

Of particular importance as monomers (IIIc) are hydroxy-functional monomers, examples being (meth)acrylic acid $C_1$–$C_{15}$ alkyl esters substituted by one or two hydroxyl groups. Particularly significant hydroxy-functional comonomers are (meth)acrylic acid $C_2$–$C_8$ hydroxyalkyl esters, such as n-hydroxyethyl, n-hydroxypropyl, or n-hydroxybutyl (meth)acrylate.

The polymer (PIII) is prepared by free-radical addition polymerization. Appropriate polymerization methods, such as bulk, solution, suspension or emulsion polymerization, are known to the skilled worker.

The copolymer is preferably prepared by solution polymerization with subsequent dispersion in water or, with particular preference, by emulsion polymerization.

In the case of the emulsion polymerization, the comonomers can be polymerized in a customary manner in the presence of water-soluble initiator and an emulsifier at preferably from 30 to 95° C.

Examples of suitable initiators are sodium, potassium and ammonium persulfate, tert-butyl hydroperoxides, water-soluble azo compounds, or redox initiators.

Examples of emulsifiers used are alkali metal salts of relatively long-chain fatty acids, alkyl sulfates, alkylsulfonates, alkylated arylsulfonates, or alkylated biphenyl ether sulfonates. Further suitable emulsifiers are reaction products of alkylene oxides, especially ethylene oxide or propylene oxide, with fatty alcohols, fatty acids or phenols, and/or alkyl phenols.

In the case of aqueous secondary dispersions, the copolymer is prepared first by solution polymerization in an organic solvent and is subsequently dispersed in water without the use of an emulsifier or dispersing auxiliary but with the addition to copolymers containing carboxylic acid groups of salt formers, e.g., ammonia. The organic solvent may be removed by distillation. The preparation of aqueous secondary dispersions is known to the skilled worker and is described, for example, in DE-A-37 20 860.

In order to adjust the molecular weight, regulators may be used. Appropriate examples are -SH-containing compounds such as mercaptoethanol, mercaptopropanol, thiophenol, thioglycerol, ethyl thioglycolate, methyl thioglycolate, and tert-dodecyl mercaptan, which may be used additionally in amounts, for example, of from 0 to 0.5% by weight, based on the copolymer.

The nature and amount of the comonomers is preferably chosen such that the resulting copolymer has a glass transition temperature of from −60 to +140° C., preferably from −60 to +100° C. The glass transition temperature of the copolymer is determined by means of differential thermoanalysis or differential scanning calorimetry in accordance with ASTh 3418/82.

The number-average molecular weight $M_n$ is preferably from $10^3$ to $5 \cdot 10^6$, with particular preference from $10^5$ to $2 \cdot 10^6$ g/mol (determined by gel permeation chromatography using polystyrene as the standard).

The polymers (P) may further comprise (polymers PIV) a water-dispersible polyester which carries carboxyl groups.

The water-dispersible polyesters which carry carboxyl groups (polymer IV) are known, for example, from Encyclopedia of polymer science and engineering, John Wiley & Sons, second edition, volume 12, pages 300 to 313.

The aqueous dispersions comprising the polymer (P) usually have a solids content of from 10 to 70% by weight.

The mixtures of the invention comprising compound (V) and polymer (P) may comprise commercially customary auxiliaries and additives such as wetting agents, defoamers, flatting agents, emulsifiers, thickeners and thixotropic agents, and colorants such as dyes and pigments.

They are suitable, for example, for the adhesive bonding or coating of different substrates such as wood, metal, plastics, paper, leather or textile, for the impregnation of textiles, and for the production of moldings and printing inks.

The polyurethane dispersions of the invention may be processed by the processes widespread in the adhesives, leather or coatings industry; i.e., by spraying, rolling or knife-coating the dispersions onto the substrate and then drying them.

Where the dispersions are processed as adhesives, the coated workpieces are joined to another workpiece, preferably with application of pressure, either before the dispersion film has dried or after drying.

Particularly firm adhesive bonds are obtained if workpieces that have been provided with a dried adhesive film are heated to a temperature of from about 50 to 100° C. directly before, during or after joining.

The adhesive bonds produced by these methods are particularly notable for the fact that they are stable on storage and possess high thermal stability.

EXPERIMENTAL SECTION

1. Preparation of a Hydrophilic Polycarbodiimide 110 g of an NCO-terminated carbodilmide made from TMXDI and having an NCO content of 7.8% by weight were introduced with stirring into a solution of 8 g of NaOH pellets and 17.8 g of beta-alanine in 80 g of water and 150 g of acetone. After 120 minutes of stirring at 50° C., the acetone was stripped off under reduced pressure and the mixture was diluted with 170 g of water. A colloidal, aqueous solution of a carbodiimide having a solids content of 34% and an LT of 100 is obtained.

USE EXAMPLE 1

Utility as Adhesive

First of all, a polyurethane dispersion was prepared. 594 g of a polyester diol made from isophthalic acid, adipic acid and hexane diol (OHZ=56.6) and 40.2 g of dimethylolpropionic acid in 200 g of acetone were admixed with 0.5 g of DBTL and 60.9 g of TDI and 58.9 g of HDI were metered in at 60° C. After 6 h 40 min at 65–68° C., the mixture was diluted with 700 g of acetone and cooled to 50° C. The NCO content was now 0.54%. The mixture was neutralized with 9.6 g of 50% strength NaOH and diluted with 40 g of DI water. After 10 minutes, the mixture was dispersed with 950 g of DI water. The acetone was distilled off in vacuo at 100 mbar and 43° C., and the solids content was adjusted to approximately 40%.

SC: 39.7% LT: 94 pH: 6.4 Visc.: 79 mPas K value: 47

USE EXAMPLE 1.1

150 g of the PU dispersion from USE EXAMPLE 1 are mixed with 22.2 g of the CDI solution from 1.

USE EXAMPLE 1.2

150 g of the PU dispersion from USE EXAMPLE 1 are mixed with 11.1 g of the CDI solution.

USE EXAMPLE 1.3

150 g of the PU dispersion from USE EXAMPLE are used without CDI solution.

1.4 Performance Testing

The mixtures were subjected to RF/PVC bonding and the heat stability was measured.

1.4.1 Preparation of the Test Specimens

The tests were carried out in accordance with the following test specifications:

| | |
|---|---|
| Substrate: | Rigid fiberboard/PVC sheet, type: Benecke 577/E28 |
| Dimensions: | 200 × 200 mm |
| Bonding area: | 200 × 170 mm (subdivided into 5 test strips each measuring 30 mm) |
| Application: | 2 mm wire-wound coating bar onto rigid fiberboard in lengthwise direction |
| Drying: | 3 min at 60° C. |
| Mode of bonding: | Hot pressing at 80° C., PVC side only |
| Pressing pressure: | 0.1 N/mm$^2$ |
| Pressing duration: | 30 s |
| Sample storage:: | 1 day at RT |
| Test load: | 300 g per 30 mm wide test strip |
| Peel angle: | 180° |
| Number of samples: | 1 plate = 5 samples |

1.4.2 Load Testing and Evaluation

The tests were carried out in accordance with the following test specifications:

Following application of the adhesive, drying and pressing, 30 mm wide strips with an interval of 10 mm in between are cut from the area produced in this way. When cutting, it is only the sheet which is separated; the rigid fiberboard remains undamaged. The 10 mm wide strips in between are removed and a 300 g weight is clamped to each of the 30 mm wide test strips.

The test begins at 40° C. At intervals of 30 minutes the temperature is raised by 10° C. In the heating phase, which lasts 15 minutes, the test strips are not loaded.

Assessment of the Fracture Type:

C=separation in the adhesive film without detachment from one material (cohesive fracture)

1.4.3 Results

An evaluation is made of the temperature, measured in ° C., at which the bond still holds.

If there is more than 10 mm of peeling, the test is finished. The test results are summarized in Table 1.

TABLE 1

| Experiment | HS |
|---|---|
| Example 1.1 | 2 × 110° C., 3 × 120° C. |
| Example 1.2 | 1 × 110° C., 4 × 120° C. |
| Example 1.2 | 6 × 90° C. |

USE EXAMPLE 2

Preparation of a Polyacrylate Dispersion

To 200 g of deionized water in a 2 l reactor there were added, at 85° C., 6 g of a solution of 2 g of sodium persulfate in 68 g of water (feed stream 2) and 15.5 g of an emulsion of 370 g of styrene, 400 g of n-butyl acrylate, 21 g of acrylic acid, 16 g of a 50% aqueous solution of acrylamide, 32 g of a 20% aqueous solution of an ethoxylated (n=18) saturated linear $C_{16}C_{18}$ fatty alcohol and 12 g of a 45% aqueous solution of the sodium salt of the disulfonic acid of a dodecyl-substituted diphenyl ether in 470 g of water (feed stream 1), and this mixture was initially polymerized for 30 minutes. Subsequently the remainders of feed streams 1 and 2 were added over 2 hours and over 2 hours 15 minutes, respectively. Polymerization was continued at 85° C. for 2 hours and then the product was neutralized with concentrated ammonia solution to a pH of 8.

SC 49% pH: 8.0 LT: 23 Visc.: 1720 mPas

USE EXAMPLE 2.1

150 g of the acrylate dispersion from USE EXAMPLE 2 were diluted to a solids content of 25% and mixed with 2.5 g of the CDI solution.

USE EXAMPLE 2.2

150 g of the acrylate dispersion from USE EXAMPLE 2 were diluted to a solids content of 25% and mixed with 5 g of the CDI solution.

USE EXAMPLE 2.3 (COMPARATIVE)

150 g of the acrylate dispersion from Example 2 were diluted to a solids content of 25% and used without CDI solution.

Films 1 mm thick were cast from the dispersions of use Example 2.1 to 2.3 and dried at room temperature for 14 days.

2.4 Testing

The films were subjected to a tensile test in accordance with DIN 53504.

The results are summarized in Table 2:

TABLE 2

| Use Example | Yield stress (MPa) | Elongation at break (%) |
|---|---|---|
| 2.1. | 7.2 | 430 |
| 2.2. | 8.4 | 410 |
| 2.3. (Comparative) | 6.2 | 320 |

The increase in yield stress and elongation at break indicates crosslinking.

We claim:

1. A compound containing carbodiimide units and carboxyl or carboxylate groups (compound V), derived from
   a) aliphatic or araliphatic $C_4$ to $C_{20}$ polyisocyanates (component a)
   b) amino carboxylic acids or amino carboxylic salts (component b) and
   c) optionally, further compounds which carry groups able to react with isocyanate groups in an addition reaction (component c)
   d) optionally, other isocyanates (component d), the carbodiimide units deriving essentially exclusively from the isocyanate groups of component (a).

2. The compound (V) as claimed in claim 1, containing from 200 to 2000 mmol/kg of carboxyl or carboxylate groups, based on the weight of the compound.

3. The compound (V) as claimed in claim 1, wherein component (a) comprises hexamethylene diisocyanate or 1,3-bis(1methyl-1-isocyanatoethyl)benzene.

4. The compound (V) as claimed in claim 1, wherein the amino carboxylic acids and/or amino carboxylic salts comprise α- or β-amino carboxylic acids, or the Michael adducts of diprimary diamines with α,β-unsaturated carboxylic acids or carboxylic salts.

5. The compound (V) as claimed in claim 1, wherein component (c) comprises aromatic compounds, aliphatic compounds or araliphatic compounds, the araliphatic compounds carrying polyalkylene oxide groups optionally, said compounds having 1 to 20 carbon atoms, the count of carbon atoms not including the carbon atoms of the polyalkylene oxide groups, and having at least one functional group selected from the group consisting of secondary amino group, primary amino group and alcoholic hydroxyl group.

6. A process for preparing a compound (V) as claimed in claim 1, which comprises:
   I. preparing carbodiimides having terminal isocyanate groups by carbodiimidizing some of the isocyanate groups of component (a), and II. reacting the isocyanato-terminal compounds prepared in step I with component (b) and, optionally, with components (c) and (d).

7. The mixture of a compound (V) as claimed in claim 1 and an aqueous dispersion comprising a polymer (P).

8. The mixture as claimed in claim 7, wherein the polymer (P) carries carboxyl groups.

9. The mixture as claimed in claim 7, wherein polymer (P) comprises a polyurethane (PII) synthesized from
   IIa) diisocyanates having 4 to 30 carbon atoms,
   IIb) diols of which
      IIb1) from 10 to 100 mol %, based on the total amount of the diols (IIb), have a molecular weight ranging from 500 to 5000, and
      IIb2) from 0 to 90 mol %, based on the total amount of the diols (IIb), have a molecular weight ranging from 60 to 500 g/mol,
   IIc) monomers different than monomers (IIa) and (IIb) and containing at least one isocyanate group or at least one isocyanate-reactive group, and further having at least one hydrophilic group or potentially hydrophilic group, thereby rendering the polyurethanes dispersible in water,
   IId) optionally, further polyfunctional compounds different than the monomers (IIa) to (IIc) and having reactive groups which comprise alcoholic hydroxyl groups, primary or secondary amino groups or isocyanate groups, and
   IIe) if desired, monofunctional compounds different than the monomers (IIa) to (IId) and having a reactive group which comprises an alcoholic hydroxyl group, a primary or secondary amino group or an isocyanate group.

10. The mixture as claimed in claim 7, wherein polymer (P) comprises a polymer (PIII) synthesized from
    IIIa) from 30 to 99.9% by weight of principal monomers selected from the group consisting of $C_1$ to $C_{20}$ alkyl (meth)acrylates, vinyl esters of carboxylic acids containing up to 20 carbon atoms, vinylaromatic compounds having up to 20 carbon atoms, ethylenically unsaturated nitrites, vinyl halides, and aliphatic hydrocarbons having 2 to 8 carbon atoms and 1 or 2 double bonds,
    IIIb) from 0 to 20% by weight of a carboxylic acid having one olefinic double bond, and
    IIIc) from 0 to 20% by weight of free-radically polymerizable monomers different than (IIIa) and (IIIb).

11. An article adhesively bonded or coated with a mixture as claimed in claim 7, or a textile impregnated with said mixture.

12. The compound (V) as claimed in claim 2, containing from 500 to 1800 mmol/kg of carboxyl or carboxylate groups, based on the weight of the compound.

13. The compound (V) as claimed in claim 1, wherein the proportion of carbodiimide groups ranges from 0.05 to 8 groups, based on the weight of the compound.

14. The compound (V) as claimed in claim 13, wherein the proportion of carbodiimide groups ranges from 0.1 to 5 groups, based on the weight of the compound.

* * * * *